(12) United States Patent
Curry et al.

(10) Patent No.: US 11,084,907 B2
(45) Date of Patent: Aug. 10, 2021

(54) NANOCELLULOSIC COMPOSITIONS

(71) Applicant: TUSKEGEE UNIVERSITY, Tuskegee, AL (US)

(72) Inventors: Michael L. Curry, Tuskegee, AL (US); Donald White, Tuskegee, AL (US)

(73) Assignee: TUSKEGEE UNIVERSITY, Tuskegee, AL (US)

( * ) Notice: Subject to any disclaimer, the term of this patent is extended or adjusted under 35 U.S.C. 154(b) by 0 days.

(21) Appl. No.: 16/028,127

(22) Filed: Jul. 5, 2018

(65) Prior Publication Data

US 2019/0048147 A1 Feb. 14, 2019

Related U.S. Application Data

(60) Provisional application No. 62/528,774, filed on Jul. 5, 2017.

(51) Int. Cl.

| C08J 3/07 | (2006.01) |
| C08L 1/02 | (2006.01) |
| D01F 2/02 | (2006.01) |
| C08B 15/02 | (2006.01) |
| C08J 5/00 | (2006.01) |
| C08L 25/06 | (2006.01) |
| C08J 3/21 | (2006.01) |
| B82Y 40/00 | (2011.01) |
| B82Y 30/00 | (2011.01) |

(52) U.S. Cl.
CPC ............... *C08J 3/07* (2013.01); *C08B 15/02* (2013.01); *C08J 3/212* (2013.01); *C08J 5/005* (2013.01); *C08L 1/02* (2013.01); *C08L 25/06* (2013.01); *D01F 2/02* (2013.01); *B82Y 30/00* (2013.01); *B82Y 40/00* (2013.01); *C08J 2300/16* (2013.01); *C08J 2300/22* (2013.01); *C08J 2300/24* (2013.01); *C08L 2201/06* (2013.01)

(58) Field of Classification Search
CPC ....................................... C08J 3/07; C08L 1/02
See application file for complete search history.

(56) References Cited

U.S. PATENT DOCUMENTS

| 2010/0233468 A1* | 9/2010 | Ioelovich | C08B 15/02 428/326 |
| 2010/0240806 A1* | 9/2010 | Kondo | B82Y 30/00 524/35 |
| 2010/0272819 A1* | 10/2010 | Engelhardt | A61K 8/04 424/494 |

(Continued)

FOREIGN PATENT DOCUMENTS

WO WO-2014153645 A1 * 10/2014 ........ B01J 20/28026

OTHER PUBLICATIONS

Kim et al. (Polymer Engineering and Science, 2009, vol. 49, 2054-2059) (Year: 2009).*

(Continued)

*Primary Examiner* — Liam J Heincer
(74) *Attorney, Agent, or Firm* — Beusse Sanks, PLLC (57) ABSTRACT

The invention relates to a method of manufacturing a nanocellulosic composition comprising cellulose nanoparticles and/or nanoparticles. The nanocellulosic compositions are useful in the manufacturing of biodegradable plastics. The invention also includes a method of manufacturing biodegradable plastics using such nanocellulosic compositions.

7 Claims, 10 Drawing Sheets

(56) References Cited

U.S. PATENT DOCUMENTS

| | | | | |
|---|---|---|---|---|
| 2015/0111998 A1* | 4/2015 | Kawamoto | | B29B 7/56 |
| | | | | 524/37 |
| 2015/0167231 A1* | 6/2015 | Semba | | C08L 1/02 |
| | | | | 525/54.23 |
| 2015/0322191 A1* | 11/2015 | Hamad | | C08F 251/02 |
| | | | | 525/107 |
| 2016/0002462 A1* | 1/2016 | Zhang | | C08L 97/02 |
| | | | | 524/733 |
| 2016/0016345 A1* | 1/2016 | Kumar | | D01F 6/54 |
| | | | | 423/447.2 |
| 2016/0177084 A1* | 6/2016 | Hamada | | C08L 63/10 |
| | | | | 523/440 |
| 2016/0186382 A1* | 6/2016 | Nikkila | | B29B 7/845 |
| | | | | 162/146 |
| 2016/0194462 A1* | 7/2016 | Wada | | D21H 11/18 |
| | | | | 524/35 |
| 2016/0355710 A1* | 12/2016 | Feng | | C09J 161/06 |
| 2016/0369125 A1* | 12/2016 | Ozcan | | C09D 163/00 |
| 2017/0015822 A1* | 1/2017 | Nelson | | D21H 21/18 |
| 2017/0027168 A1* | 2/2017 | Heath | | A01N 25/30 |
| 2017/0283669 A1* | 10/2017 | Lipscomb | | C09J 133/08 |
| 2017/0333602 A1* | 11/2017 | Amiralian | | C08G 18/4854 |
| 2018/0030261 A1* | 2/2018 | Bay | | C08L 1/02 |
| 2018/0119235 A1* | 5/2018 | Talianski | | B82Y 40/00 |
| 2018/0179369 A1* | 6/2018 | Ito | | C08L 101/00 |
| 2019/0055324 A1* | 2/2019 | Orlov | | C08B 11/14 |
| 2019/0203001 A1* | 7/2019 | Rangari | | C08J 5/18 |

OTHER PUBLICATIONS

Khoo et al. (Procedia Chemistry 19 (2016) 788-794) (Year: 2016).*
Huntley et al., "Chemical Functionalization and Characterization of Cellulose Extracted from Wheat Straw Using Acid Hydrolysis Methodologies," Int'l. J. of Polymer Sci., vol. 2015, pp. 1-9.

* cited by examiner

NANOCELLULOSIC COMPOSITIONS

RELATED APPLICATIONS

This application claims priority to U.S. provisional application 62/528,774, filed on Jul. 5, 2017, which is herein incorporated by reference in its entirety.

GOVERNMENT RIGHTS

This invention was made with government support under grant number CHE 1503408 awarded by the National Science Foundation ("NSF"). The government has certain rights in the invention.

FIELD OF THE INVENTION

This invention relates to compositions containing nanocellulose that find use in the manufacturing of biodegradable plastics, as well as biodegradable plastics made from such compositions. This invention also relates to methods for preparing biodegradable plastic compositions containing nanocellulose and methods of manufacturing biodegradable plastics using such compositions.

BACKGROUND

Plastic is a widely used in many industrial and technological areas, owing to its durability, ease of processing, chemical inertness, and low cost of production. For example, plastic is used widely as a disposable material for packaging food and beverages, transporting goods (e.g., plastic bags), and protecting merchandise during shipping. However, while the durability and chemical inertness of disposable plastic articles make such articles valuable during their useful lifetime, the low rate of decomposition of plastic is a serious problem for the environment, both on land and in marine-based ecosystems.

Cellulose is a biodegradable polysaccharide polymer that is found in the cell walls of green plants. It is the most abundant organic polymer on earth, but it has found limited use in the manufacturing of plastics. For example, because cellulose is a hydrophilic material, it does not readily form stable composites with non-hydrophilic polymers or disperse evenly when mixed with non-hydrophilic polymeric materials. To alleviate these problems, cellulose may be derivatized using various reactions, including olefination reactions (e.g., the Wittig reaction, or the Bamford-Stevens-Shapiro reaction), oxidation reactions (e.g., Albright-Goldman reaction, Jones reaction), reduction reactions (e.g., the Wolff-Kishner reaction), or silylation reactions (e.g., reactions with trimethylsilane). However, such derivation reactions can be cumbersome and add an undesirable layer of complexity to the plastic manufacturing process. Accordingly, it would be useful to have a method of preparing cellulose-containing biodegradable plastics that does not require performing any reactions to derivatize the cellulose in order to render it more compatible with the other polymers in the plastic.

SUMMARY

In one aspect, this invention provides a method of preparing a biodegradable plastic. The method comprises dissolving one or more polymers into a solvent to form a solution. Purified nanocellulose is added to the solution to form a stable suspension. The stable suspension is processed to form the biodegradable plastic.

In another aspect, the invention provides a biodegradable plastic made according to the methods of the invention. In preferred embodiments, the biodegradable plastic comprises nanocellulose at a weight percentage in the range of about 1 wt % to about 50 wt %. The biodegradable polymer comprises optionally one or more additives.

BRIEF DESCRIPTION OF THE DRAWINGS

FIG. 1.

FIG. 3A a plot of the percent weight change of three types of nanocellulose versus temperature; FIG. 3B plots of the first derivative of the curves from part (a) to show the inflection points of the curves, which correspond to the maximum rate of thermal decomposition.

FIG. 6.

FIG. 10: FIG. 10A (internal region) and FIG. 10B (boarder region) show optical micrographs images of the stable suspension of cellulose in organic solvent dispersed evenly throughout the HIPS polymer composite. FIG. 10C (internal region) and FIG. 10D (external region) show an unstable suspension of cellulose in organic solvent dispersed unevenly throughout the HIPS polymer composite. The stable suspension of cellulose has a high degree of uniform cellulose dispersion within polymer composites vs low degree of cellulose dispersion within the polymer composite observed for the unstable suspension of cellulose.

DETAILED DESCRIPTION

In one aspect, this invention provides a method for manufacturing biodegradable plastics containing nanocellulose. Among other things, this invention recognizes that a stable suspension prepared by dissolving one or more types of polymer in a suitable solvent and then adding nanocellulose can be used to prepare a biodegradable cellulose-containing plastics without the need for derivatizing the cellulose prior to incorporating it into the plastic. Thus, the methods of manufacturing biodegradable plastic provided by this invention can be used to produce cellulose-containing plastic inexpensively and efficiently.

Figure 1:
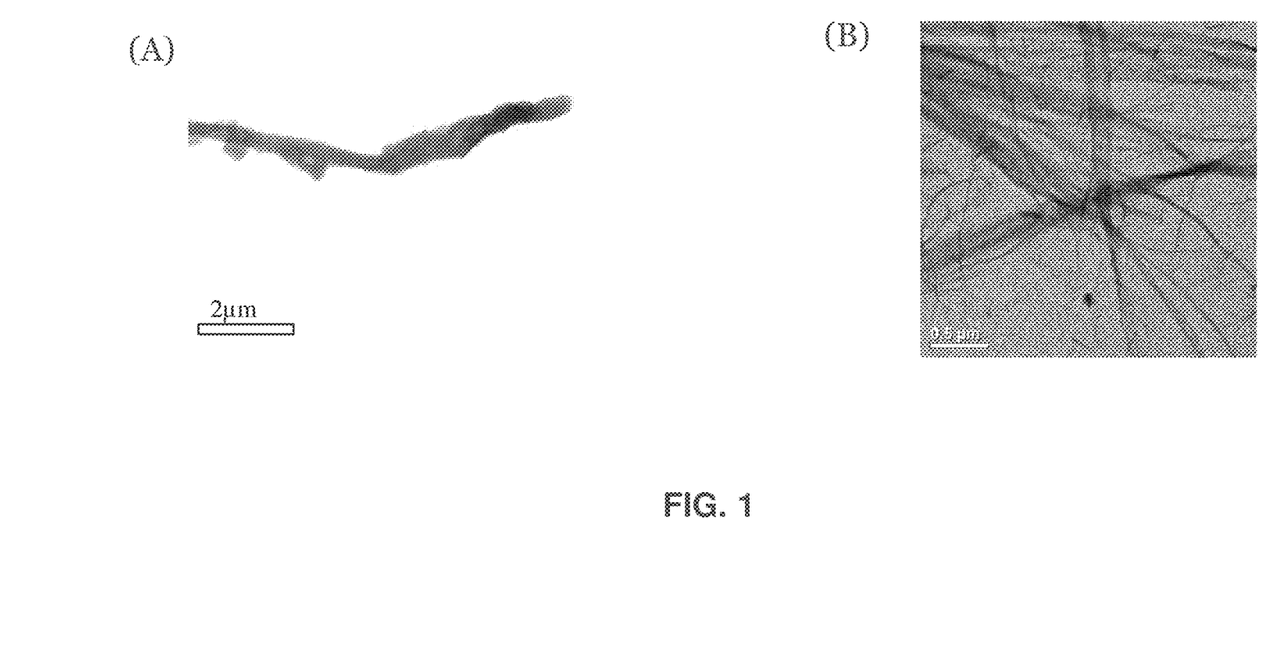
FIG. 1A a TEM micrograph of a cellulose nanofibril prepared in accordance with an exemplary embodiment of the invention.
FIG. 1B a TEM micrograph showing a network of nanofibrils prepared according to an exemplary embodiment of the invention.
Figure 2:
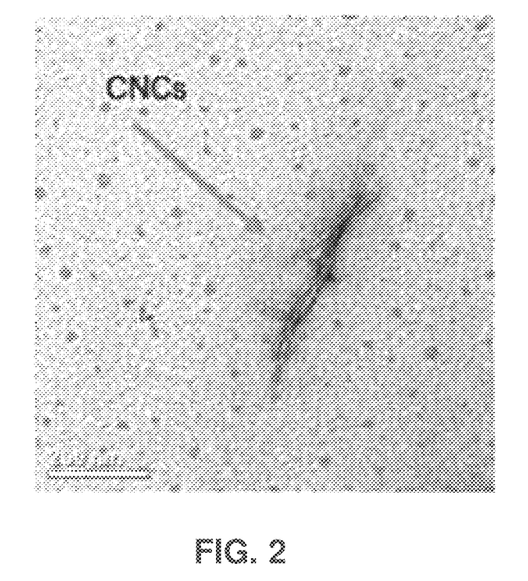
FIG. 2: a TEM micrograph of a cellulose nanocrystal prepared in accordance with an exemplary embodiment of the invention.

As used herein, "nanocellulose" refers to cellulose particles which have at least one dimension in the range of about 1 nm to about 100 nm. In certain cases, the nanocellulose may be in the form of "nanofibrils." As used herein, a "nanofibril" refers to a generally elongate, strand-like particle of cellulose which has a diameter on the order of one to hundreds of nanometers and a crystallinity that is less than about 80%, as measured by x-ray diffraction using the so-called "height methodology." This methodology is described, for example, by C. J. Huntley et al., in "Chemical Functionalization and Characterization of Cellulose Extracted from Wheat Straw Using Acid Hydrolysis Methodologies," *Intl. J. of Polymer Sci.*, Vol. 2015, pp. 1-9, which is hereby incorporated by reference in its entirety. Briefly, the percent crystallinity of a nanocellulose sample may be calculated according to the following equation:

$$\% \text{ Crystallinity} = \frac{I_{Crystalline}}{I_{Amorphous} + I_{Crystalline}} \times 100\%$$

where $I_{Crystalline}$ corresponds to the (002) crystalline peak located at approximately 2θ of 22.5° and $I_{Amorphous}$ is the highest peak in the amorphous background region located at a 2θ value of about 18°. In certain embodiments, the aspect ratio (length to width) of a nanofibril may be, for example, in the range of 15:1 to 60:1, 25:1 to 50:1, or 30:1 to 40:1. FIG. 1A shows a TEM micrograph of a cellulose nanofibril with a high aspect ratio as prepared in accordance with an exemplary embodiment of the invention. The nanofibril shown in FIG. 1 has a thickness of about few hundred nanometers, but the length of the nanofibril is several microns. In certain cases, the nanofibrils may comprise one or more branches, as shown in the TEM micrograph in FIG. 1B. In general, the nanofibrils are largely comprised of amorphous cellulose (e.g., greater than 20%, 30%, 40% 50%, 60%, 70% 80% or even 90% amorphous cellulose content), although nanofibrils may contain regions of crystalline cellulose. In other embodiments, the nanocellulose is in the form of nanocrystals. As used herein, a "nanocrystal" of cellulose is a substantially crystalline (>80% crystalline) particle of cellulose. An example of a nanocrystal prepared in accordance with the invention is shown in FIG. 2. This invention recognizes, among other things, that crystalline cellulose has greater chemical stability and resistance to mechanical stress. The specific type of crystalline cellulose is not particularly limited and can be, for example, cellulose I ($I_\alpha$ or $I_\beta$), II, III ($III_1$ or $III_2$) or IV ($IV_1$ or $IV_2$). In certain embodiments, the crystalline cellulose is in the form of cellulose I ($I_\alpha$ or $I_\beta$). While the nanocellulose may be in the form of nanoparticles of crystalline cellulose, the invention also specifically contemplates embodiments wherein the nanocellulose is not crystalline.

One aspect of this invention is to provide biodegradable plastics that are composites containing nanocellulose and at least one other polymer, which may or may not be biodegradable. The types of polymers that are contemplated by the invention are not particularly limited. They may be biodegradable polymers, non-biodegradable polymers, and/or combinations thereof. They may be thermoplastic or thermosetting polymers. In addition, they may be naturally occurring polymers and/or synthetic polymers. When second polymer comprises a copolymer, the copolymer may be a random copolymer, alternating copolymer, or block copolymer. Non-limiting examples of polymers contemplated by the invention include polystyrene, high-impact polystyrene, acrylonitrile butadiene styrene, polyesters, polyalkyleneimines, polylactic acid, polyglycolic acid, polylactic coglycolic acid), polycaprolactone, polyvinyl alcohol, cross-linked polyvinyl alcohol, cross-linked polyvinyl butyrate, ethylene ethylacrylate copolymer, polyethylhexylacrylate, polyvinyl chloride, polyvinyl acetals, plasticized ethylene vinylacetate copolymer, ethylene vinylchloride copolymer, polyvinyl esters, polyvinylbutyrate, polyvinylformal, poly (hydroxyl alkanoates), polyamides, polymethacrylate, polymethylmethacrylate, polybutylmethacrylate, polyvinyl chloride, nylon, polyethylene, high-density polyethylene, low-density polyethylene, polyethylene terephthalate, natural rubber, polyisoprene, polyisobutylene, polybutadiene, high-density polyethylene, low-density polyethylene, polytetrafluoroethylene, polyvinylidene chloride, polyurethane, polyacrylonitrile, cross-linked polyvinylpyrrolidone, polytrifluorochloroethylene chlorinated polyethylene, poly(1,4-isopropylidene diphenylene carbonate), vinylidene chloride, acrylonitrile copolymer, vinyl-chloride-diethyl fumarate copolymer, silicone rubbers, polycarbonate, and siloxanes, as well as combinations thereof.

Figure 3:
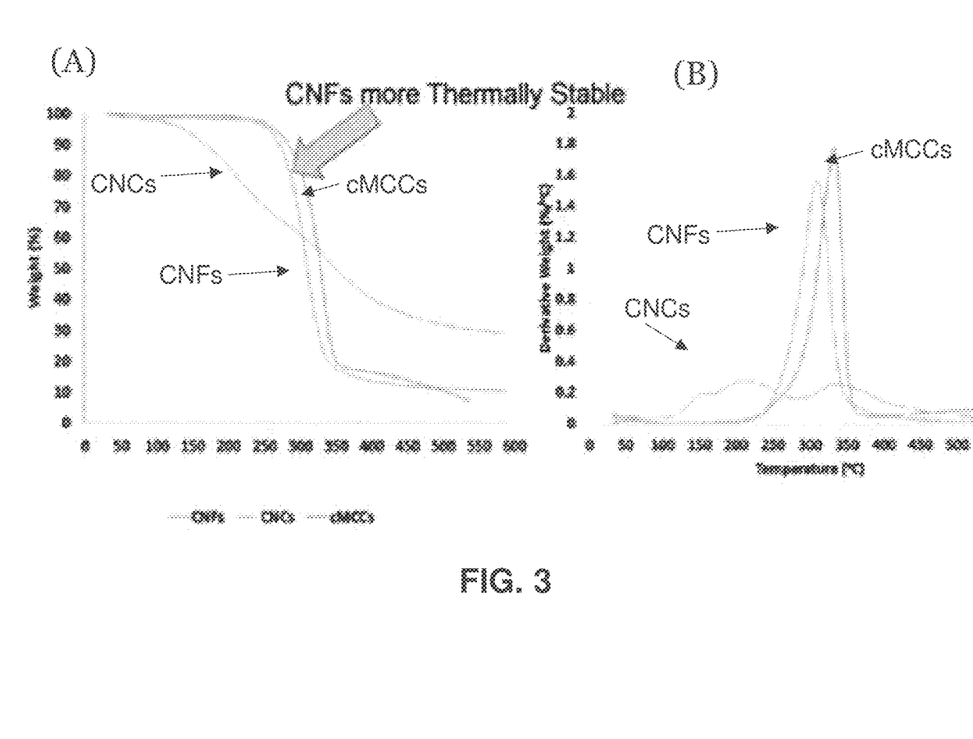
FIG. 3: Results of a thermal stability study comparing cellulose nanofibrils, cellulose nanocrystals of crystalline cellulose, and commercial microcrystalline cellulose (cMCCs)

The amount of nanocellulose in the biodegradable plastic prepared in accordance with this invention may vary depending on the desired biodegradation rate and the desired physical and chemical properties of the biodegradable plastic. For example, the nanocellulose may be present in the biodegradable plastic that constitutes the biodegradable plastic article at a concentration in the range of about 1% to about 50% by weight, or about 5% to about 45% by weight, or by 10% to about 40% by weight, or about 15% to about 35% by weight. The nanocellulose in the biodegradable plastic of the invention may be in the form of nanoparticles, nanofibrils, or a combination thereof. However, one aspect of the invention is the recognition that cellulose nanofibrils prepared in accordance with the invention are more thermally stable than cellulose nanoparticles, and therefore are particularly useful when the biodegradable plastic is required to be heat resistant. For example, FIG. 3 shows the results of a thermal stability study comparing cellulose nanofibrils (CNFs), cellulose nanocrystals (CNC), and commercial microcrystalline cellulose (cMCC). FIG. 3A provides a plot showing the percent weight change of these three types of cellulose upon heating, which is a measure of stability against heat-induced degradation. The curves in FIG. 3A show that, of the three types of cellulose studied, the cellulose nanofibrils remained near 100% of their weight over the greatest temperature range during heating. This indicates that the cellulose nanofibrils are more thermally stable than the cellulose nanocrystals or the cMCC's used in this study. FIG. 3B plots the first derivative of the curves from part (a) to show the inflection points of the curves. The peak positions in the curves in FIG. 3B correspond to the temperatures at which the thermal degradation reaches its maximum rate. FIG. 3B shows that the maximum degradation rate of cellulose nanofibrils occurs at a higher temperature than the maximum degradation rate of the other cellulosic materials used in this study, further confirming the higher thermal stability of the cellulose nanofibrils.

In addition to the nanocellulose and one or more additional polymers, the biodegradable plastics of the invention may include additives to impart certain desirable characteristics. Non-limiting examples of additives contemplated by the invention include plasticizer, a pigment, a filler, an extender, a fragrance, an impact modifier, an antimicrobial, an antioxidant, an antistatic agent, a flame retardant, and combinations thereof.

Figure 4:
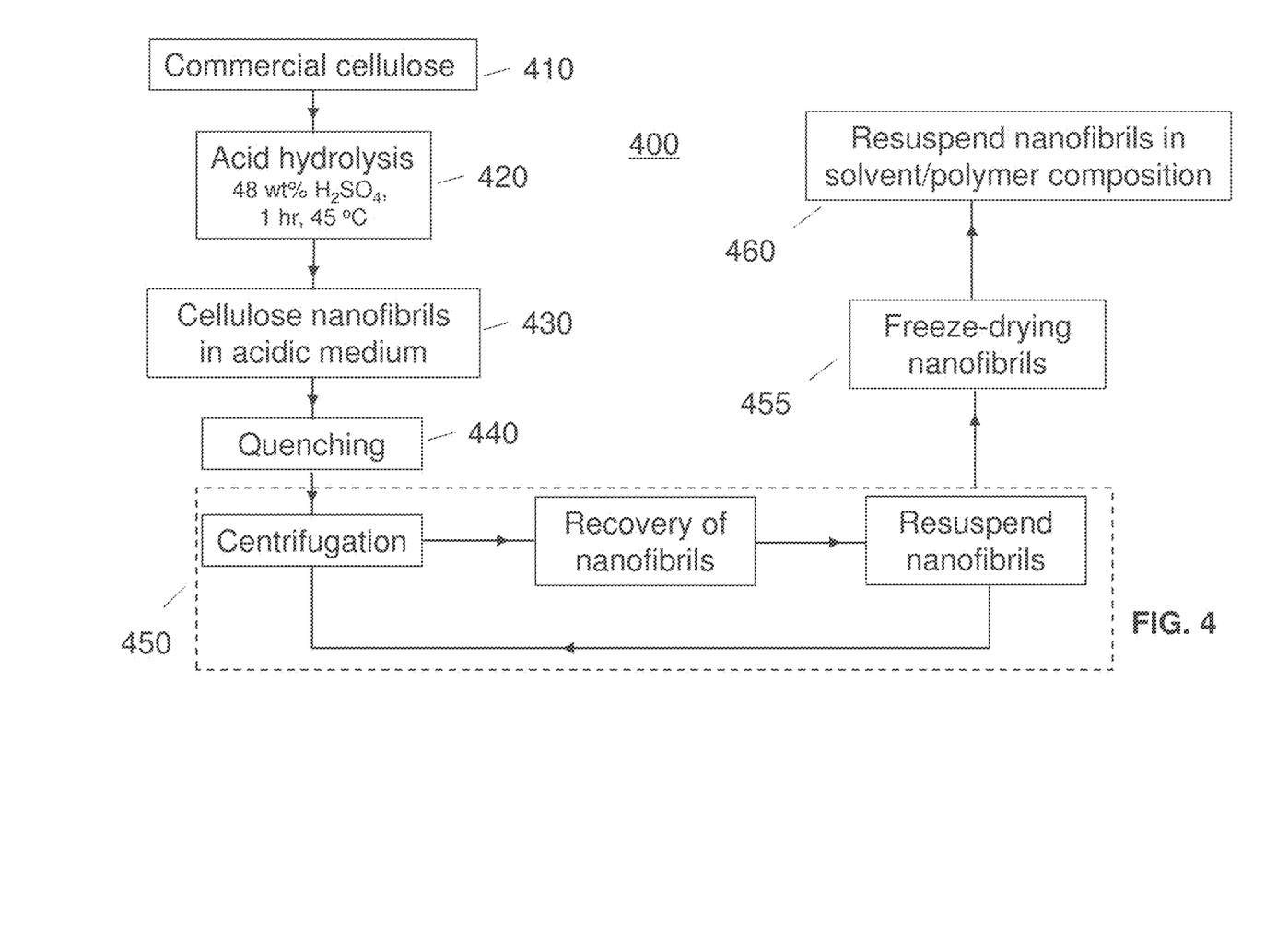
FIG. 4: A flow chart for preparing cellulose nanofibrils that are suitable for use in manufacturing biodegradable plastics according to one exemplary embodiment of the invention.

This invention recognizes that cellulose on the nanometer scale (e.g., between 1 nm and 100 nm) and micrometer scale (e.g., between 1 µm to 20 µm) can be suspended in a solvent-polymer composition, as described herein. However, the invention also recognizes that larger cellulose particles will result in more unstable suspensions with a shorter suspension time. Thus, nanocellulose is preferred and suitable forms of nanocellulose may be prepared in a variety of different ways, including acid hydrolysis and enzymatic cleavage of larger cellulose particles. Acid hydrolysis of the cellulose may be accomplished by exposing the cellulose to a mineral acid (e.g., $H_2SO_4$, $HNO_3$, $H_3PO_4$ or HCl, with polyprotic acids being preferred) or any other type of acid that is capable of breaking down cellulose via cleavage of the β-1,4-glycosidic bonds (e.g., acetic acid). Moreover, the invention recognizes that by appropriate choice of the acid concentration during hydrolysis, the size and the morphology of the nanocellulose can be varied. For example, when cellulose is added to an aqueous acidic solution containing sulfuric acid at a concentration in the range of about 44 wt % to about 52 wt %, the acid hydrolysis reaction may produce cellulose nanofibrils. FIG. 4 shows one non-limiting example of an acid hydrolysis reaction to form nanofibrils according to one embodiment of the invention. In FIG. 4, process 400 comprises subjecting commercial cellulose 410 to acid hydrolysis conditions 420 (48 wt % $H_2SO_4$, 1 hr, 45° C.), thereby resulting in the formation of cellulose nanofibrils in an acidic medium 430. After the hydrolysis reaction from step 430 is deemed complete, it is quenched in quenching step 440, which involves adding sufficient water to stop the acid hydrolysis reaction. The cellulose nanofibrils are then recovered in purification step 450, which may involve repeated cycles of centrifugation, recovery of the nanofibrils, and resuspending the cellulose nanofibrils in water. If desired, resuspension of the nanofibrils at this stage may be assisted by sonicating the aqueous nanocrystal composition (e.g., at frequency in the range of about 20 kHz to about 30 kHz for about 1-5 minutes). In preferred embodiments, step 450 is carried out at a reduced temperature (e.g., at about 4° C.) to suppress undesirable acid hydrolysis reactions that potentially may occur as the result of residual acid impurities that may be present during this purification step. Step 455 involves freeze-drying the cellulose nanofibrils after purification step 450 is completed. One aspect of the invention is the recognition that the solubility of the freeze-dried cellulose nanofibrils can be improved if the cellulose nanofibrils are freeze dried under conditions that promote chiral nematic alignment of the nanofibrils. In this regard, an exemplary freeze-drying protocol includes the steps of (1) freezing an aqueous suspension of nanofibrils after purification step 450 to a temperature of about −80° C., (2) reducing the pressure to about 200 mTorr, and (3) maintaining the pressure at about 200 mTorr for about 36 hours. In step 460, the freeze-dried cellulose nanofibrils from step 455 are resuspended in a solvent-polymer composition to form a stable suspension of nanofibrils. The stable suspension of nanofibrils formed in step 460 may be used as the starting material for manufacturing biodegradable plastics or as the plastic forming system itself, as discussed herein.

Figure 5:
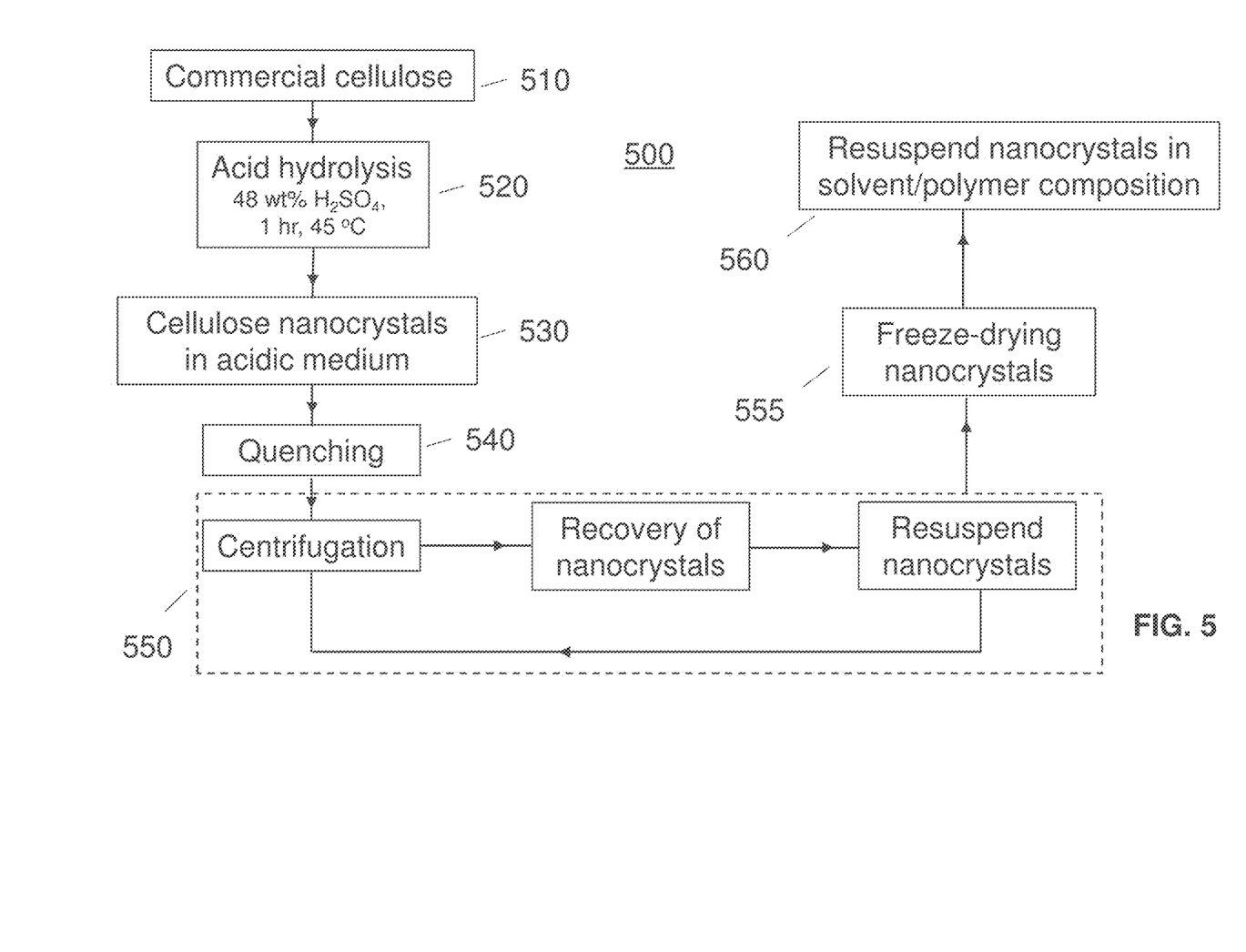
FIG. 5: A flow chart for preparing cellulose nanocrystals that are suitable for use in manufacturing biodegradable plastics according to one exemplary embodiment of the invention.

Instead of nanofibrils, the acid hydrolysis reactions may be used to form nanocrystals by increasing the concentration of the acid. For example, when cellulose is added to an aqueous acidic solution containing sulfuric acid at a concentration in the range of about 56 wt % to about 64 wt %, the acid hydrolysis reaction may produce cellulose nanocrystals. FIG. 5 shows one non-limiting example of an acid hydrolysis reaction to form nanocrystals according to one embodiment of the invention. In FIG. 5, process 500 comprises subjecting commercial cellulose 510 to stronger acid hydrolysis conditions 520 (64 wt % $H_2SO_4$, 1 hr, 45° C. and ambient conditions), thereby resulting in the formation of cellulose nanoparticles in an acidic medium 530. After the hydrolysis reaction from step 530 is deemed complete, it is quenched in quenching step 540, which involves adding sufficient water to stop the acid hydrolysis reaction. The cellulose nanoparticles are then recovered in purification step 550, which may involve repeated cycles of centrifugation, recovery of the nanocrystals, and resuspending the cellulose nanocrystals. If desired, resuspension of the nanocrystals at this stage may be assisted by sonicating the aqueous nanocrystal composition (e.g., at frequency in the range of about 20 kHz to about 30 kHz for about 1-5 minutes). In preferred embodiments, step 550 is carried out at a reduced temperature (e.g., at about 4° C.) to suppress undesirable acid hydrolysis reactions that potentially may occur as the result of residual acid impurities that may be present during this purification step. Step 555 involves freeze-drying the cellulose nanocrystals after purification step 550 is completed. As in the case for the cellulose nanofibrils, it is advantageous to freeze dry the nanocrystals under conditions that promote chiral nematic alignment. This can be achieved, for example, using the lyophilization process described herein for preparation of nanofibril-containing compositions. In step 560, the cellulose nanocrystals from step 555 are resuspended in a solvent-polymer composition to form a stable suspension of cellulose nanocrystals. The stable suspension of nanocrystals formed in step 560 may be used as the starting material for manufacturing biodegradable plastics or as the plastic forming system itself, as discussed herein.

Figure 6:
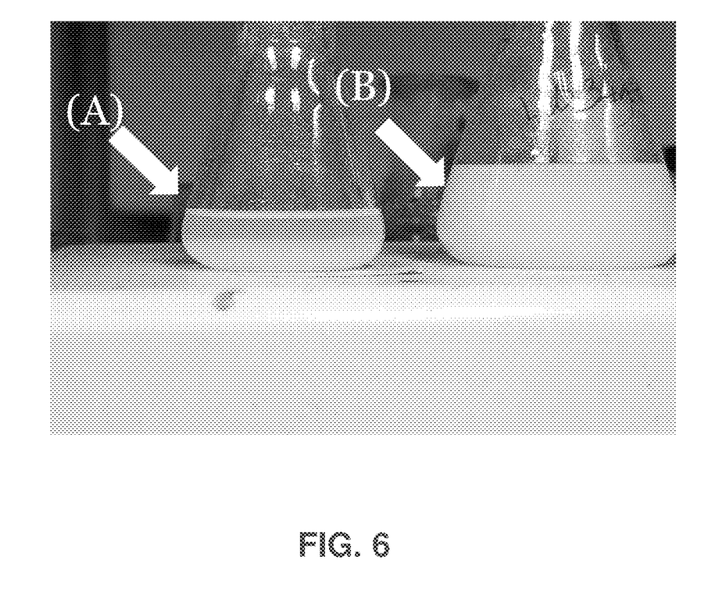
FIG. 6A An unstable suspension of nanocellulose in chloroform prepared by adding the nanocellulose to chloroform (20:1 by weight of chloroform to nanocellulose) and agitating the mixture.
FIG. 6B a stable suspension prepared by adding nanocellulose prepared in accordance with the invention to a solution of chloroform with pre-dissolved high-impact polystyrene (HIPS) at a ratio of 20:1:1 by weight of chloroform:nanocellulose:HIPS and agitating via shaking for one minute.

Steps 460 and 560 of exemplary processes 400 and 500 involve the formation of a stable suspension of nanofibrils or nanocrystals. One aspect of this invention is the recognition that it is advantageous to use a stable suspension of cellulose nanofibrils or nanocrystals, including those formed in steps 460 and 560 of exemplary processes 400 and 500, as an ingredient in the formation of biodegradable plastics. In this context, a "stable suspension" means a mixture containing nanocellulose (which may be present as nanofibrils, nanocrystals, or a mixture thereof) and a solvent-polymer composition in which the nanocellulose remains isotropically dispersed (i.e., dispersion is invariant with respect to direction) in the solvent on the time scale of at least several minutes to several hours. By contrast, nanocellulose suspensions that are not stable typically will exhibit rapid settling of the nanocellulose after less than one minute after such mixtures are prepared. Without wishing to be limited by theory, it is believed that the polymer acts a surfactant that promotes the suspension of nanocellulose (preferably freeze-dried nanocellulose as described herein) within the solvent-polymer composition. In general, useful ratios of solvent to polymer should fall in the range of 400 to 1, or 40 to 1, or 30 to 1, or about 20 to about 1, by weight. In certain embodiments, the amount of a polymer added to the solvent, before addition of the nanocellulose, produces a solvent/polymer composition with a viscosity in the range of 50-25,000 cP, or 1,000-10,000 cP, or 2,000-5,000 cP. In some embodiments, the solvent/polymer composition has a viscosity of about 2,000-3,000 cP. Moreover, the ratio of the polymer to nanocellulose in the stable suspension may be in the range of 10:1 to 1:10, or 9:1 to 1:9, or 8:1 to 1:8, or 7:1 or 1:7, or 6:1 or 1:6, or 5:1 or 1:5, or 4:1 or 1:4, or 3:1 or 1:3, or 2:1 or 1:2, or 1:1 (by weight). One aspect of this invention is the recognition that increasing the relative amount of nanocellulose to polymer results in a faster biodegradation rate, but also causes the resultant biodegradable plastic to be less mechanically stable or rigid. Such biodegradable plastics with relatively high nanocellulose content may find use in a variety of different applications, such as packaging and fillers. If desired, the ratio of solvent:polymer:nanocellulose may be 20:1:1 (by weight). In certain embodiments, the nanocellulose in stable suspensions remains isotropically dispersed in the solvent on a timescale in the range of about 5 minutes to about 30 minutes, about 60 minutes to about 5 hours, or about six hours to about 24 hours. For the purposes of illustration, FIG. 6A shows a photograph of an unstable suspension of nanocellulose in chloroform, prepared by adding the nanocellulose to chloroform and agitating the mixture by shaking for one minute. Despite the agitation, the nanocellulose composition in FIG. 6A has substantially settled and is no longer isotropically distributed throughout the chloroform. By contrast, FIG. 6B shows a stable suspension of nanocellulose prepared by adding nanocellulose to a composition containing chloroform and acrylonitrile butadiene styrene to produce a resultant composition containing chloroform:nanocellulose:acrylonitrile butadiene styrene at a ratio of 20:1:1 and agitating the mixture shaking for one minute. As shown in FIG. 6B, the nanocellulose in this resultant composition is substantially isotropically dispersed. In general, a stable suspension of nanocellulose may be prepared, for example, by adding freeze-dried nanocellulose as described herein to a polymer/solvent composition and agitating the nanocellulose/polymer/solvent composition (e.g., by shaking) until a stable suspension is formed. Other methods may also be used, including applying acoustic energy to the nanocellulose/polymer/solvent mixture (e.g., sonicating). When the stable suspension is prepared by sonicating, it is useful to use sonicate at a frequency in the range of about 20 kHz to about 30 kHz for about 1-5 minutes. If desired, other techniques, such as high-speed shear mixing, may also be used to create a stable suspension of nanocellulose from a nanocellulose/polymer/solvent mixture.

The type of solvent used to prepare the stable suspensions of nanocellulose is not particularly limited and includes any solvent that is chemically compatible with the nanocellulose and is capable of solubilizing the other polymers that are added to form the biodegradable plastic. In certain cases, it is useful to use a solvent with a vapor density of approximately 2. The solvent may be a polar solvent or a non-polar solvent. For example, in certain cases, the solvent is water. Non-limiting examples of other suitable solvents include chloroform, methylene chloride, acetone, dimethyl ketone, methyl ethyl ketone, hexanes, and dimethyl ether, to name just a few.

Figure 7:
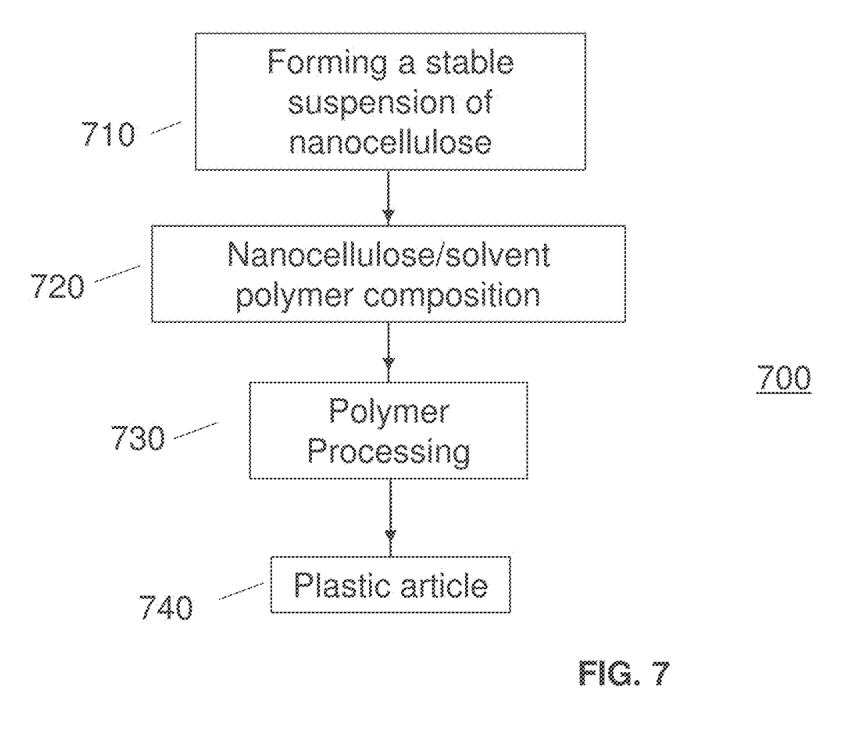
FIG. 7: A flow chart showing a process for manufacturing biodegradable plastic according to one embodiment of the invention.

One aspect of this invention is the recognition that a stable suspension of nanocellulose (nanofibrils or nanocrystals) can be used as a starting material for the manufacturing of biodegradable plastics without any need for chemically modifying the nanocellulose. For example, FIG. 7 shows a method of preparing a biodegradable plastic according to one embodiment of the invention where the nanocellulose is not derivatized or otherwise chemically modified prior to incorporation into the biodegradable plastic. In FIG. 7, process 700 comprises step 710, in which a stable suspension of nanocellulose is formed by adding nanocellulose to a solvent-polymer composition as described herein to form a nanocellulose/solvent/polymer composition 720. In certain embodiments, composition 720 may be in the form of a liquid mixture. Alternatively, composition 720 may be in the form of a semisolid mixture (e.g., a paste or a slurry) or a solid mixture. Semisolid or solid forms of composition 720 may be obtained by removing a sufficient amount of solvent from a previously formed liquid nanocellulose/solvent/polymer composition. Composition 720 is then further processed in step 730 to form the desired biodegradable plastic article. In general, the polymer processing techniques in step 730 for processing composition 720 are not particularly limited, and can be any processing technique which is compatible with the nanocellulose and polymers in composition 720 and which is capable of forming the desired biodegradable plastic article 740. Non-limiting examples of polymer processing techniques contemplated by the invention for step 730 include extruding, solvent casting, injection molding, compression molding, blow molding, transfer molding, rotational molding, thermoforming, heat sealing, embossing, stamping, and combinations thereof. Thus, in one exemplary embodiment, composition 720 is a liquid nanocellulose/polymer/solvent composition and polymer processing step 730 involves solvent casting composition 720 to form biodegradable plastic article 740. In another exemplary embodiment, composition 720 is prepared as a paste that is subsequently extruded during polymer processing step 730. In certain embodiments, composition 720 is processed into small pellets for subsequent use as a masterbatch that is combined with other polymers and/or additives.

Figure 8:
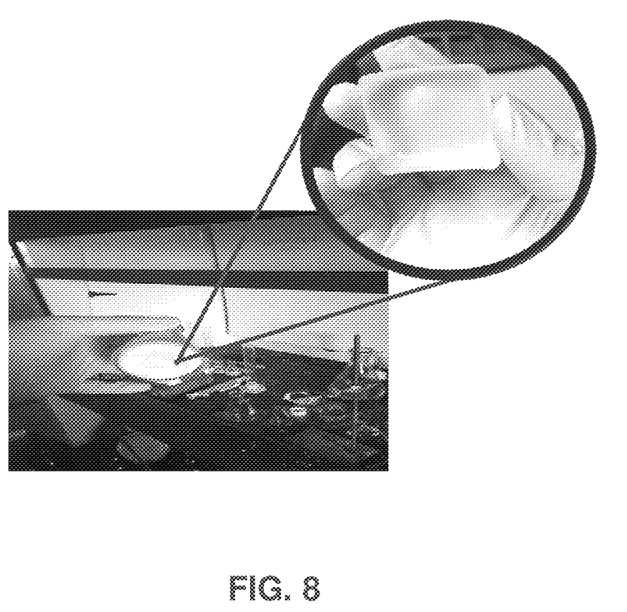
FIG. 8: A photograph of a nanocellulose-containing biodegradable plastic made in accordance with one exemplary embodiment of the invention.

FIG. 8 shows a biodegradable plastic made in accordance with one exemplary embodiment of the invention. In FIG. 8, the biodegradable plastic was made by combining cellulose nanofibrils prepared in accordance with the invention with high-impact polystyrene/chloroform composition to form a 20:1:1 (by weight) solvent/nanofibril/high-impact polystyrene composition that was subsequently solvent cast. The biodegradable plastic had a cellulose nanofibril content of about 10% by weight.

Settling Test: UV-VIS

Figure 9:
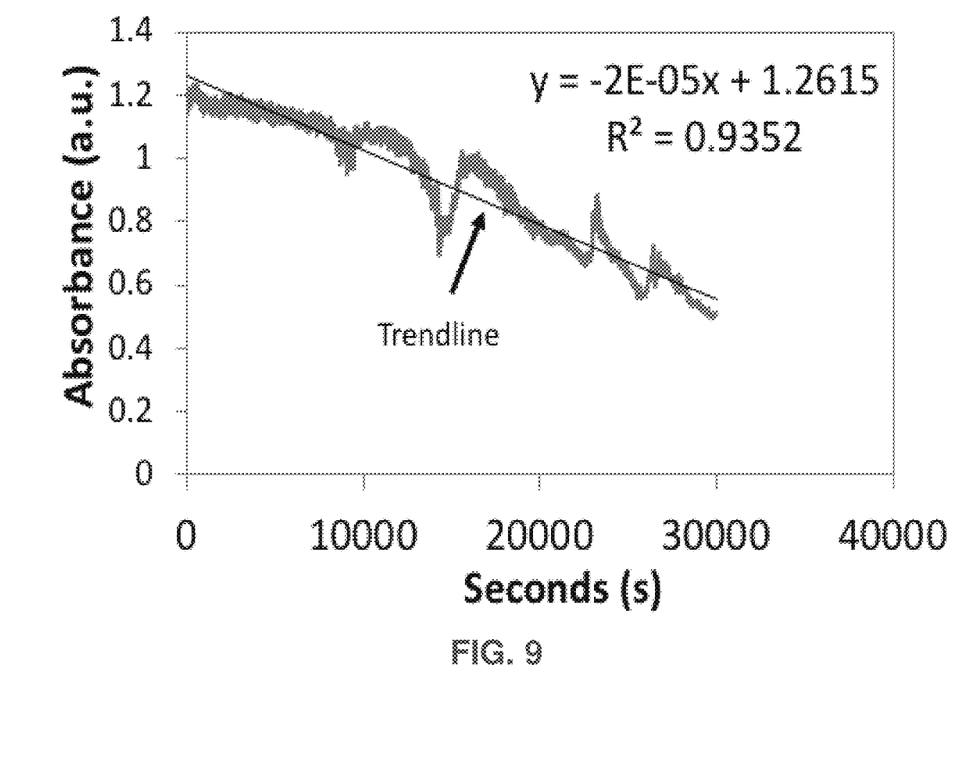
FIG. 9: UV-vis graph revealing the settling rate of the stable suspension of cellulose within organic solvent carbon tetrachloride. Approximately 20 days elapse before 50% of the stable cellulose suspension settles out of the organic solvent.

Using methods of the invention described herein, nanocellulose was suspended in an organic solvent—choloform—of various concentrations to measure the settling rate of the suspended nanocellulose. A standard UV-Vis Spectrometer was used to make these measurements. First, a UV-Vis spectrum was taken to observe the lambda max (i.e., maximum absorbance) of the nanocellulose suspension. The lambda max is the wavelength used for the kinetics study. Thus, the UV-Vis Spectrophotometer was set at the lambda max and the change in the lambda max absorbance was measured as the suspended nanocellulose settled out of solution over time. The Absorbance was taken in time intervals of every 2 seconds to record the drop-in "increase" amount of light being measured. A plot of the change in the absorbance of the lambda max vs. time was plotted to show the trend in nanocelloluse settling. Furthermore, the slope of the line is calculated to reveal the approximate settling rate. FIG. 9 is the UV-vis graph revealing the settling rate of the stable suspension of cellulose within organic solvent chloroform. Approximately 20 days elapses before 50% of the stable cellulose suspension settles out of the organic solvent.

OM-Images

Figure 10:
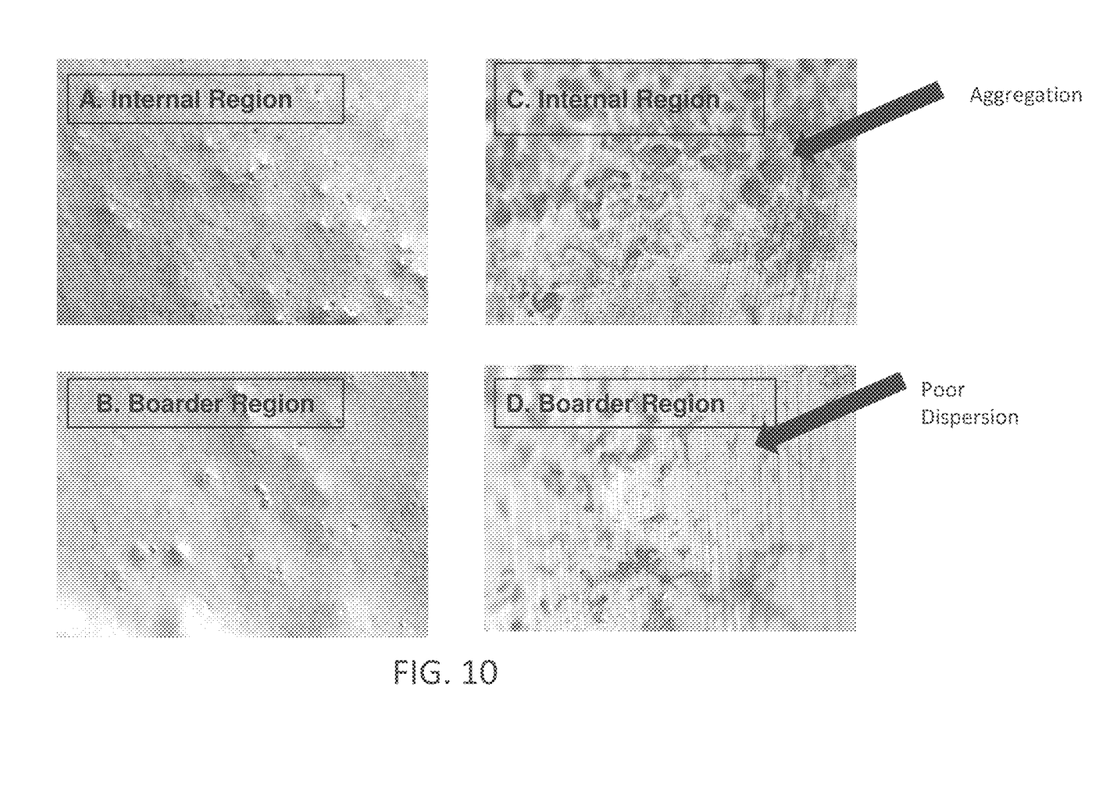

Thin film samples were prepared in concordance with the method of the invention described herein as well as other films with thicknesses less than 0.21 microns in order to show advantages of the inventive films. These samples were characterized via Optical Imaging to determine the degree of nanocellulose dispersion within the HIPS polymer network after being formed into a composite. See FIG. 10. Cuts were taken out of the composites at the center, upper-outer edge, and inner rim from both samples for comparison. As can be seen from the images, the nanocellulose dispersed with the films of the invention show uniform separation throughout the HIPS polymer matrix. See FIG. 10A and FIG. 10B. Nanocellulose dispersed without the use of the inventive technology within the HIPS polymer network, show nanocellulose aggregation in certain areas and non-uniform dispersion throughout the polymer matrix. See FIG. 10C and FIG. 10D.

What is claimed is:

1. A method of preparing a biodegradable plastic, the method comprising:

dissolving a one or more polymers into a solvent to form a solution;

adding nanocellulose to the solution to form a stable suspension; and processing the stable suspension to form the biodegradable plastic comprising nanocellulose at a weight percentage in the range of about 10 wt % to about 40 wt %; wherein the solvent, the polymer, and the cellulose are present in a ratio of 20:1:1 in the suspension prior to the processing;

wherein the nanocellulose is prepared by subjecting nanocellulose to an acidic medium capable of hydrolyzing the cellulose to form nanocellulose;

recovering the nanocellulose from the acidic medium;

resuspending the recovered nanocellulose in water; and lyophilizing the recovered cellulose to form a dry powdered nanocellulose.

2. The method according to claim 1, wherein the processing step comprises extruding, solvent casting, injection molding, compression molding, blow molding, transfer molding, rotational molding, or thermoforming the first composition.

3. The method according to claim 1, wherein the nanocellulose comprises nanofibrils of cellulose.

4. The method according to claim 3, wherein the nanofibrils have an aspect ratio in the range of 1:20 to 1:50.

5. The method according to claim 1, wherein the steps of recovering the nanocellulose from the acidic medium and resuspending the recovered nanocellulose in water are performed at a temperature in the range of about 1° C. to about 15° C.

6. The method according to claim 1, wherein the step of recovering the nanocellulose from the acidic medium comprises quenching the acidic medium with water;

washing the nanocellulose with water to remove the acidic medium;

at least one cycle of centrifuging the nanocellulose, and recovering a nanocellulose pellet.

7. The method according to claim 6, wherein the step of recovering the nanocellulose comprises three cycles of centrifuging.

* * * * *